United States Patent
Yoo et al.

(10) Patent No.: US 10,807,396 B2
(45) Date of Patent: Oct. 20, 2020

(54) METHOD FOR FORMING BEZEL PATTERN USING INKJET PRINTING

(71) Applicant: LG CHEM, LTD., Seoul (KR)

(72) Inventors: Jae-Hyun Yoo, Daejeon (KR); Mi-Kyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 100 days.

(21) Appl. No.: 16/061,323

(22) PCT Filed: Feb. 24, 2017

(86) PCT No.: PCT/KR2017/002090
§ 371 (c)(1),
(2) Date: Jun. 11, 2018

(87) PCT Pub. No.: WO2017/175971
PCT Pub. Date: Oct. 12, 2017

(65) Prior Publication Data
US 2019/0039394 A1 Feb. 7, 2019

(30) Foreign Application Priority Data
Apr. 8, 2016 (KR) .................. 10-2016-0043445

(51) Int. Cl.
C09D 11/101 (2014.01)
C09D 11/326 (2014.01)
B41M 5/00 (2006.01)
C09D 11/322 (2014.01)
B41M 7/00 (2006.01)
(Continued)

(52) U.S. Cl.
CPC ............ B41M 5/0023 (2013.01); B41J 3/407 (2013.01); B41J 11/002 (2013.01); B41M 5/0011 (2013.01); B41M 7/009 (2013.01); B41M 7/0081 (2013.01); C09D 11/101 (2013.01); C09D 11/102 (2013.01); C09D 11/322 (2013.01); C09D 11/326 (2013.01)

(58) Field of Classification Search
CPC ... C09D 11/101; C09D 11/102; C09D 11/322; C09D 11/326
See application file for complete search history.

(56) References Cited

U.S. PATENT DOCUMENTS 5,863,678 A * 1/1999 Urano .................. C08K 5/0041
430/7
7,954,430 B2 6/2011 Chretien et al.
(Continued)

FOREIGN PATENT DOCUMENTS

EP 2065208 B1 12/2013
JP 2000-117960 4/2000
(Continued)

Primary Examiner — Dah-Wei D. Yuan
Assistant Examiner — Kristen A Dagenais-Englehart
(74) Attorney, Agent, or Firm — Dentons US LLP

(57) ABSTRACT

The present invention relates to a method for forming a bezel pattern using inkjet printing, and according to the present invention, there is an advantage in that it is possible to form a bezel pattern which is smooth without a curing shrinkage when the bezel pattern is formed and has excellent adhesion strength to a base material, and accordingly it is possible to provide a bezel pattern which has excellent performance, durability, and chemical resistance and a display substrate including the same.

14 Claims, 1 Drawing Sheet

(51) Int. Cl.
*C09D 11/102* (2014.01)
*B41J 3/407* (2006.01)
*B41J 11/00* (2006.01)

(56) References Cited

U.S. PATENT DOCUMENTS

| | | | |
|---|---|---|---|
| 9,242,504 | B2 | 1/2016 | Ikeda et al. |
| 2006/0275700 | A1* | 12/2006 | Lee .................... G02F 1/133711 430/270.1 |
| 2008/0043180 | A1* | 2/2008 | Hagiwara ............... G02B 5/201 349/106 |
| 2008/0081125 | A1 | 4/2008 | Jung et al. |
| 2012/0111951 | A1 | 5/2012 | Ikeda et al. |
| 2014/0342129 | A1* | 11/2014 | Kim ....................... B41M 3/003 428/172 |
| 2015/0111009 | A1 | 4/2015 | Choi et al. |
| 2015/0226990 | A1* | 8/2015 | Miyazaki .......... G02F 1/133723 349/123 |
| 2016/0229170 | A1 | 8/2016 | Cho et al. |
| 2017/0198157 | A1 | 7/2017 | Park et al. |
| 2017/0321073 | A1* | 11/2017 | Yoo ........................ C09D 11/38 |

FOREIGN PATENT DOCUMENTS

| | | | |
|---|---|---|---|
| JP | 2009-132151 | 6/2009 | |
| JP | 2011-194799 | 10/2011 | |
| JP | 2015-052785 | 3/2015 | |
| JP | 2015-525371 | 9/2015 | |
| JP | 2016-540259 | 12/2016 | |
| KR | 10-2008-0030882 | 4/2008 | |
| KR | 10-2015-0037514 | 4/2015 | |
| KR | 10-2015-0142512 | 12/2015 | |
| KR | 10-2016-0037125 | 4/2016 | |
| WO | WO-2013179237 A1 * | 12/2013 | ............. G03F 7/105 |

* cited by examiner

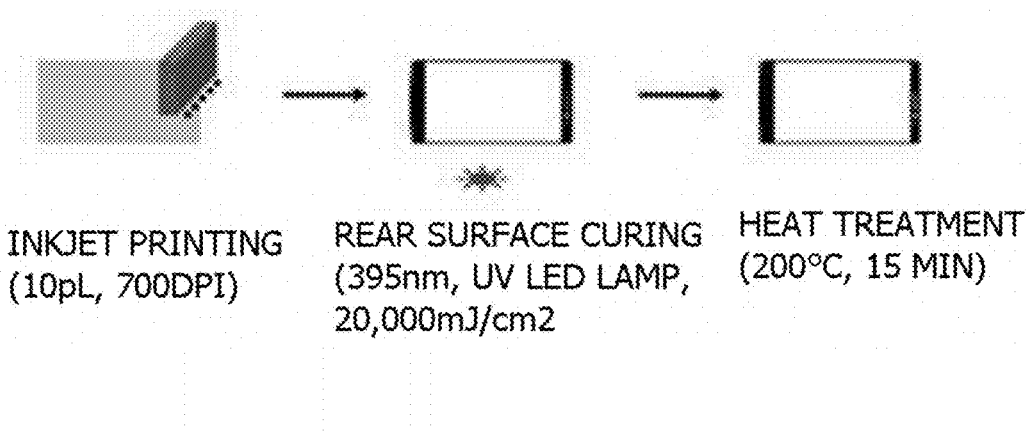

METHOD FOR FORMING BEZEL PATTERN USING INKJET PRINTING

This application is a National Stage Application of International Application No. PCT/KR2017/002090 filed on Feb. 24, 2017, which claims priority to and the benefit of Korean Patent Application No. 10-2016-0043445 filed in the Korean Intellectual Property Office on Apr. 8, 2016, both of which are incorporated herein in their entirety by reference for all purposes as if fully set forth herein.

TECHNICAL FIELD

The present invention relates to a method for forming a bezel pattern using inkjet printing.

BACKGROUND ART

The process of forming a touch panel bezel pattern in the related art has been carried out by a screen printing method in most cases. However, in order to obtain a certain level of an optical density (OD) by the screen printing method, two degree or more printing is required, and as a result, when a bezel pattern having a thickness at a level of 10 μm is formed on a substrate, and an electrode is formed thereon, a short-circuit is likely to occur at the interface between a bezel pattern and a substrate.

Accordingly, there have been attempts to form a bezel pattern by an inkjet printing method. The inkjet printing method has an advantage in that a desired pattern can be formed in a short period of time in a non-contact manner by an ultraviolet-curing method or thermal curing method, and the optical density of a product can be achieved by adjusting a dot interval of an inkjet drop.

Currently, most of the bezel patterns are printed on tempered glass, but since it is difficult to apply a thermal curing method at high temperature, which is used in an existing tempered glass, in order to print a bezel pattern on a film substituting for tempered glass or various base materials, a method for forming a bezel pattern by means of an ultraviolet-curing method has been used.

DISCLOSURE

Technical Problem

When a bezel pattern is formed by an inkjet printing method as described above, there is an advantage in that printing can be carried out at a time in a thickness smaller than that by a screen printing method. Accordingly, since an ink for an inkjet process should be able to block light even in a relatively small thickness of 4 to 7 μm, an ink composition including a pigment in a high content is needed. However, when an ink composition including a pigment such as carbon black in a high content is cured by an ultraviolet ray, the pigment on the surface thereof absorbs a lot of light, so that it is difficult for the ultraviolet ray required for the curing to sufficiently reach the lower portion of a coating film. Thus, when the curing sensitivity is low, and particularly, a thick coating film having a thickness of 3 μm or more is formed, the lower portion is not sufficiently cured, or a curing shrinkage in which the cured film is wrinkled occurs, and when the curing shrinkage occurs, there occurs a problem in that light is leaked from the bezel, and the surface of the bezel becomes rough, and the surface hardness and adhesion strength are significantly decreased, as a result, there is a problem in that the performance of the product deteriorates. Further, a bezel pattern in which the lower portion is not sufficiently cured has a problem in that the adhesive property to a substrate also deteriorates.

In order to prevent the curing shrinkage, a method of adjusting the composition of an ink composition or lowering the printing thickness, and the like have been used in the related art. There is a method of using a polyfunctional monomer having a rapid reaction rate or lowering the content of a pigment in adjusting the composition of an ink composition, but there is a disadvantage in that when a polyfunctional monomer is added in a large amount, it is difficult to carry out the inkjet printing process due to a significant increase in the viscosity of the ink, and when the content of the pigment is lowered, it is difficult to exhibit a sufficient light blocking effect from a printed thickness. In the case of the method of lowering the printing thickness, as the content of the pigment in the ink composition should be further increased in order to secure light blocking characteristics, there occurs a problem in that the viscosity is increased and the curing sensitivity is significantly decreased.

In order to solve the problems in the related art, an object of the present invention is to provide a method for forming a bezel pattern which is capable of carrying out an inkjet printing, sufficiently cures the lower portion thereof, and does not generate the curing shrinkage by using a UV-curable ink composition containing a pigment in a high content.

Further, another object of the present invention is to provide a method for manufacturing a bezel, which exhibits excellent characteristics without a curing shrinkage by including the method for forming a bezel pattern.

In addition, still another object of the present invention is to provide a bezel pattern formed by the method for forming a bezel pattern, in which the bezel pattern is smooth without a curing shrinkage and has excellent light blocking characteristics and adhesion strength, and a display substrate including the same.

Technical Solution

In order to accomplish the above object, the present invention provides a method for forming a bezel pattern using inkjet printing, the method including:

a) forming a bezel pattern on a substrate by inkjet printing a UV-curable ink composition on the substrate;

b) rear surface-curing the bezel pattern by irradiating the bezel pattern with a UV ray; and c) heat-treating the rear surface-cured bezel pattern.

Further, the present invention provides a method for manufacturing a bezel, including the method for forming a bezel pattern.

In addition, the present invention provides a bezel pattern formed by the method for forming a bezel pattern and a display substrate including the same.

Effects of the Invention

According to the present invention, there is an advantage in that it is possible to form a bezel pattern which is smooth without a curing shrinkage when the bezel pattern is formed and has excellent adhesion strength to a base material, and accordingly it is possible to provide a bezel pattern which has excellent performance, durability, and chemical resistance and a display substrate including the same.

BRIEF DESCRIPTION OF DRAWING

FIG. 1 is a view schematically illustrating a method for forming a bezel pattern according to the present invention.

DETAILED DESCRIPTION OF THE INVENTION

Hereinafter, the present invention will be described in more detail.

The bezel pattern in the present invention refers to a pattern formed at the edge portion of various devices such as a clock and a display device.

The present invention relates to a method for forming a bezel pattern using inkjet printing, and the method may include the following step a) to step c).

Hereinafter, each step of the present invention will be described in detail.

First, a step of a) forming a bezel pattern on a substrate by inkjet printing a UV-curable ink composition on the substrate is carried out.

An inkjet printing means used in the present invention is not limited in its range as long as the means can form a bezel pattern. Further, as the substrate, various base materials such as glass, a film, paper, and plastic may be used.

In an exemplary embodiment of the present invention, the UV-curable ink composition may include: a pigment dispersion; one or more oligomers selected from the group consisting of a melamine acrylate oligomer and an epoxy acrylate oligomer; an adhesion strength enhancer; a binder solution; and a photoinitiator, but is not limited thereto.

Hereinafter, the composition of the UV-curable ink composition will be described in detail.

1. Pigment Dispersion

First, a pigment dispersion may include a pigment, a dispersing agent, and a first reactive monomer, and the pigment dispersion is included in an amount of 45 to 70 parts by weight based on 100 parts by weight of a UV-curable ink composition, but the content is not limited thereto. When the pigment dispersion is included in an amount of less than 45 parts by weight, it is difficult to sufficiently block light at a small thickness, and when the pigment dispersion is included in an amount of more than 70 parts by weight, the viscosity is increased, and as a result, it is difficult to carry out the inkjet printing process, so that it is preferred to include the pigment dispersion within the range.

Each composition of the pigment dispersion will be described in detail.

(1) Pigment

It is preferred that the pigment is included in an amount of 25 to 35 parts by weight based on 100 parts by weight of the pigment dispersion, and is included in an amount of 10 to 25 parts by weight based on 100 parts by weight of the UV-curable ink composition in order to secure sufficient light blocking properties, but the content is not limited thereto. As the pigment, one or more pigments known in the art or a mixture thereof may be used, but it is possible to use preferably a black pigment, and more preferably a carbon black pigment.

(2) Dispersing Agent

As the dispersing agent, a polymer-type, non-ionic, anionic, or cationic dispersing agent may be used, and specifically, it is preferred to use a polyethylene imine-based, urethane resin-based, acrylic resin-based or polyester-based polymer-type dispersing agent. The dispersing agents may be either added alone or used in a mixture of two or more thereof, the dispersing agent may be included in an amount of 2 to 6 parts by weight based on 100 parts by weight of the pigment dispersion, and it is more preferred that the dispersing agent is included in an amount of 3 to 3.6 parts by weight based on 100 parts by weight of the pigment dispersion, because the dispersion stability of a UV-curable ink composition for a bezel may be secured, but the content is not limited thereto. When the dispersing agent is included in an amount of less than 2 parts by weight, the viscosity of the UV-curable ink composition for a bezel is increased as the time passes due to the poor dispersion stability, and when the dispersing agent is included in an amount of more than 6 parts by weight, the performance of a bezel to be formed may deteriorate because the viscosity of the UV-curable ink composition for a bezel is increased or the contents of the other curable materials are relatively decreased.

(3) First Reactive Monomer

As the first reactive monomer, reactive monomers generally used in a UV-curable ink composition for a bezel may be used, but reactive monomers having 2 or 3 functional groups are preferred, and specifically, the reactive monomer may be one selected from the group consisting of 1,6-hexanediol diacrylate (HDDMA), hydroxypivalic acid neopentyl glycol diacrylate (HPNDA), trimethylolpropane triacrylate (TMPTA), pentaerythritol triacrylate, trimethylene propane triacrylate, pentaerythritol triacrylate, trimethylene propyl triacrylate, and propoxylated glycerol triacrylate, or a mixture of two or more thereof, and it is preferred that the reactive monomer is one selected from the group consisting of 1,6-hexanediol diacrylate (HDDMA) and hydroxypivalic acid neopentyl glycol diacrylate (HPNDA), or a mixture thereof in order to maintain a suitable viscosity of a UV-curable ink composition, but the reactive monomer is not limited thereto.

2. One or More Oligomers Selected from Group Consisting of Melamine Acrylate Oligomer and Epoxy Acrylate Oligomer The one or more oligomers selected from the group consisting of a melamine acrylate oligomer and an epoxy acrylate oligomer are added in order to secure chemical resistance (alkali resistance) of a UV-curable ink composition for a bezel provided by the present invention, and it is preferred that the oligomer is included in an amount of 5 to 15 parts by weight based on 100 parts by weight of the UV-curable ink composition in order to secure the durability and chemical resistance of the bezel, but the content is not limited thereto.

3. Adhesion Strength Enhancer

The adhesion strength enhancer is a material for improving the adhesion strength, and specifically, may be 3-glycidoxypropyl trimethoxysilane, 3-glycidoxypropyl methyl dimethoxysilane, 3-glycidoxypropyl methyl diethoxysilane, 3-glycidoxypropyl triethoxysilane, 3-acryloxypropyl trimethoxysilane, and 3-methacryloxypropyl trimethoxysilane, and the adhesion strength enhancer may be included in an amount of 0.5 to 8 parts by weight based on 100 parts by weight of the UV-curable ink composition for a bezel, but the content is not limited thereto.

4. Binder Solution

The binder solution may be composed of an epoxy-based resin and a second reactive monomer, and it is preferred that the binder solution is included in an amount of 3 to 40 parts by weight based on 100 parts by weight of the UV-curable ink composition, but the content is not limited thereto. Further, in the binder solution, the content ratio of the epoxy-based resin:the second reactive monomer may be 5:95 to 30 to 70 by parts by weight.

More specifically, the epoxy-based resin may be used without limitation as long as the epoxy-based resin may maintain the adhesion strength between a base material and a printing layer and the surface hardness, and the epoxy-based resin may be included in an amount of 5 to 30 parts by weight based on 100 parts by weight of the binder solution.

Further, since a UV-curable ink for a bezel used when a bezel pattern is formed by an inkjet process should be able to block light even in a relatively small thickness, an ink containing a pigment in a high content is required, and accordingly, since the viscosity of the ink is together increased, a monofunctional or difunctional monomer having a relatively low viscosity needs to be added as a second reactive monomer in order to adjust the viscosity to a viscosity (8 to 16 cP at a process temperature) where the inkjet process can be carried out, and as the second reactive monomer, an acrylate-based monomer may be used. Specifically, the acrylate-based monomer may be one selected from the group consisting of 2-hydroxyethyl acrylate (2-HEA), trimethylolpropane triacrylate (TMPTA), hydroxyethyl methacrylate (HEMA), hexanediol diacrylate (HDDA), hydroxypivalic acid neopentyl glycol diacrylate (HPNDA), and tripropyleneglycol diacrylate (TPGDA), or a mixture of two or more thereof, and it is preferred that the acrylate-based monomer is one selected from the group consisting of 2-hydroxyethyl acrylate (2-HEA) and trimethylolpropane triacrylate (TMPTA), or a mixture of two or more thereof in terms of viscosity and adhesion strength on a substrate, but the acrylate-based monomer is not limited thereto.

The acrylate-based monomer may be included in an amount of 10 to 95 parts by weight based on 100 parts by weight of the binder solution.

5. Photoinitiator

The photoinitiator may be one selected from the group consisting of 2-methyl-1-[4-(methylthio)phenyl]-2-(4-morpholinyl)-1-propanone (Irgacure® 907), 2,4,6-trimethylbenzoyl diphenylphosphine oxide (Darocur® TPO), bis(2,4,6-trimethylbenzoyl)-phenylphosphine oxide (Irgacure® 819), and isopropyl thioxanthone (Darocur® ITX), or a mixture of two or more thereof, and the photoinitiator may be included in an amount of 1 to 15 parts by weight based on 100 parts by weight of the UV-curable ink composition for a bezel, but the content is not limited thereto.

In an exemplary embodiment of the present invention, the UV-curable ink composition may further include one or more selected from the group consisting of a surfactant and a polymerization inhibitor.

In another exemplary embodiment of the present invention, for the UV-curable ink composition, the curing dose may be 1,000 to 20,000 mJ/cm$^2$, the composition may be cured by absorbing a UV ray with a wavelength range of 360 nm to 410 nm, and the viscosity may be 1 cp to 50 cp at 25° C., but is not limited thereto.

Next, the step of b) rear surface curing the bezel pattern by irradiating the bezel pattern with a UV ray is carried out.

When a bezel pattern is formed on a substrate by inkjet printing, an ink composition including a pigment in a high content should be used in order to secure sufficient light blocking characteristics because the thickness of the bezel pattern printed at one time is smaller than that by means of screen printing, but when the content of the pigment is increased, there occurs a problem in that the curing is not accomplished well, and in order to solve the problem, as a result of intensive studies, the present inventors could obtain a bezel pattern which secured sufficient light blocking characteristics and had no curing shrinkage by printing a bezel pattern by means of inkjet printing, and then rear surface curing the bezel pattern.

The UV-curable ink composition spreads within a short period of time immediately after inkjet printing, and thus exhibits excellent coating film characteristics, and the composition is cured to exhibit excellent adhesive characteristics. Therefore, when the UV-curable ink composition is applied, it is preferred to dispose a UV-lamp right behind the inkjet head such that the ink composition may be cured simultaneously with the inkjet printing.

In the present invention, a rear surface curing is carried out. The characteristics of the bezel pattern manufactured during the rear surface curing are better than those during the surface curing, and the reason is because wrinkles are generated on the surface of the bezel pattern by the difference in curing ratio between the upper portion and the lower portion of the bezel pattern during the surface curing, but when the rear surface or both surfaces are cured, the upper portion and the lower portion of the bezel pattern are uniformly cured, and as a result, wrinkles are not generated.

The term "rear surface" used throughout the present specification means a surface opposite to one surface of a substrate on which an ink composition is printed when a UV-curable ink composition for a bezel is formed on a substrate during the formation of the bezel pattern, and means a surface opposite to a substrate on which the ink composition is not coated, and accordingly, the term "rear surface curing" means that a curing is carried out by exposing a surface opposite to a substrate on which the ink composition is not coated.

Examples of a light source for curing the UV-curable composition include a mercury vapor arc, a carbon arc, a Xe arc, an LED curing device, and the like, which emit a light with a wavelength of 250 nm to 450 nm, but are not limited thereto.

In an exemplary embodiment of the present invention,

It is preferred that the bezel-cured bezel pattern in step b) has a thickness of 2 μm to 10 μm, a surface hardness of 4H or more, or an adhesion strength of 5B, and it is more preferred that the bezel pattern has all the characteristics. Further, the optical density is preferably 4 to 6, and in this case, there is an advantage in that shielding characteristics by means of a bezel pattern are excellent. When the optical density is more than 6, a decrease in UV curing sensitivity may be caused, and it may be difficult to form a bezel pattern because the content of a light blocking material to be introduced is increased in order to realize the optical density.

Finally, the step of heat-treating the rear surface-cured bezel pattern is carried out, and is preferred because the adhesion strength to a glass substrate may be improved when the step c) is carried out.

In an exemplary embodiment of the present invention, it is preferred to carry out the step c) at 150° C. to 250° C., and more preferred to carry out the step c) at 150° C. to 250° C. for 5 to 30 minutes, in terms of preventing the curing shrinkage from occurring. This is because when the step c) is carried out at 150° C. or less, the method is not economical because it takes too long a time to carry out the heat treatment, and when the step c) is carried out at 250° C. or more, the bezel pattern may be damaged, and when the step c) is also carried out for 5 minutes or less, the adhesion strength of the bezel pattern is not exhibited, and when the step c) is carried out for 30 minutes or more, it takes too long a time to carry out the heat treatment.

In an exemplary embodiment of the present invention, since the bezel pattern may be completely cured by means of an additional curing by further including a step b') surface curing the bezel pattern before carrying out the step c) after the step b), the step b') is preferred, but is not limited thereto. The step b') may also be carried out by curing the surface after the rear surface curing in the step b), and the same effects may also be achieved by curing both surfaces of the bezel pattern in the step b) in order to shorten the curing time.

Further, the present invention relates to a bezel pattern formed by the method for forming a bezel pattern using inkjet printing.

In an exemplary embodiment of the present invention, it is preferred that the bezel pattern has a surface hardness of 4H or more and an adhesion strength of 5B, and it is preferred that the bezel pattern has an optical density of 4 to 6.

Furthermore, the present invention provides a display substrate including the bezel pattern.

In an exemplary embodiment of the present invention, the display may be a display used in any one of a plasma display panel (PDP), a light emitting diode (LED), an organic light emitting diode (OLED), a liquid crystal display (LCD), a thin film transistor-liquid crystal display (LCD-TFT), and a cathode ray tube (CRT).

Hereinafter, the present invention will be described in more detail by non-limiting examples thereof. The form of carrying out the present invention disclosed below is an example, and the range of the present invention is not limited to the forms of carrying out the present invention. The scope of the present invention is defined by the claims, and is intended to include any modification within the meaning and scope equivalent to the terms of the claims. Further, in the following Examples and Comparative Examples, "%" and "parts" representing the content is a mass standard unless otherwise particularly mentioned.

EXAMPLES

Preparation Example 1. Preparation of UV-Curable Ink Composition 60.00 g of a pigment dispersion (manufactured by Tokushiki Co., Ltd., 18.00 g of carbon black, 3.60 g of an acrylic dispersing agent, and 38.40 g of 1,6-hexanediol dimethacrylate), 10.00 g of a melamine acrylate oligomer (Miramer SC9610, manufactured by Miwon Specialty Chemical Co., Ltd.), 19.90 g of a binder solution (17.90 g of 2-hydroxyethyl acrylate being a second reactive monomer and 2.00 g of PD7610 being an epoxy-based resin and manufactured by Almatex Corp.), 3.00 g of KBM-403 (manufactured by Shin-Etsu Chemical Co., Ltd.) as an adhesion strength enhancer, 7.00 g of a photoinitiator (5.00 g of Irgacure 907 and 2.00 g of Darocur® ITX), 0.05 g of BYK-307 being a surfactant, and 0.05 g of monomethylether hydroquinone (MEHQ) being a polymerization inhibitor were mixed, and the mixture was stirred for 6 hours to prepare 100 g of a UV-curable ink composition.

Preparation Example 2. Preparation of UV-Curable Ink Composition

A UV-curable ink composition for a bezel was prepared in the same manner as in Preparation Example 1, except that 10.00 g of an epoxy acrylate oligomer (Miramer SC6400, manufactured by Miwon Specialty Chemical Co., Ltd.) was used instead of 10.00 g of the melamine acrylate oligomer (Miramer SC9610, manufactured by Miwon Specialty Chemical Co., Ltd.).

Preparation Example 3. Preparation of UV-Curable Ink Composition 50.00 g of a pigment dispersion (15.00 g of carbon black, 3.00 g of an acrylic dispersing agent, and 32.00 g of hexanediol dimethacrylate), 10.00 g of a melamine acrylate oligomer (Miramer SC9610, manufactured by Miwon Specialty Chemical Co., Ltd.), 29.90 g of a binder solution (17.90 g of 2-hydroxyethyl acrylate being a second reactive monomer, 10.00 g of trimethylolpropane triacrylate being a second reactive monomer, and 2.00 g of PD7610 being an epoxy-based resin and manufactured by Almatex Corp.), 3.00 g of KBM-403 (manufactured by Shin-Etsu Chemical Co., Ltd.) as an adhesion strength enhancer, 7.00 g of a photoinitiator (5.00 g of Irgacure 907 and 2.00 g of Darocur® ITX), 0.05 g of BYK-307 being a surfactant, and 0.05 g of monomethylether hydroquinone (MEHQ) being a polymerization inhibitor were mixed, and the mixture was stirred for 6 hours to prepare 100 g of a UV-curable ink composition.

Preparation Example 4. Preparation of UV-Curable Ink Composition 40.00 g of a pigment dispersion (8.00 g of carbon black, 1.60 g of an acrylic dispersing agent, and 30.40 g of hydroxypivalate neopentyl glycol acrylate), 10.00 g of a melamine acrylate oligomer (Miramer SC9610, manufactured by Miwon Specialty Chemical Co., Ltd.), 39.90 g of a binder solution (15.90 g of 2-hydroxyethyl acrylate being a second reactive monomer, 22.00 g of trimethylolpropane triacrylate being a second reactive monomer, and 2.00 g of PD7610 being an epoxy-based resin and manufactured by Almatex Corp.), 3.00 g of KBM-403 (manufactured by Shin-Etsu Chemical Co., Ltd.) as an adhesion strength enhancer, 7.00 g of a photoinitiator (5.00 g of Irgacure 907 and 2.00 g of Darocur® ITX), 0.05 g of BYK-307 being a surfactant, and 0.05 g of monomethylether hydroquinone (MEHQ) being a polymerization inhibitor were mixed, and the mixture was stirred for 6 hours to prepare 100 g of a UV-curable ink composition.

Preparation Example 5. Preparation of UV-Curable Ink Composition 30.00 g of a pigment dispersion (6.00 g of carbon black, 1.20 g of an acrylic dispersing agent, and 22.80 g of hydroxypivalate neopentyl glycol acrylate), 10.00 g of a melamine acrylate oligomer (Miramer SC9610, manufactured by Miwon Specialty Chemical Co., Ltd.), 49.90 g of a binder solution (15.90 g of 2-hydroxyethyl acrylate being a second reactive monomer, 32.00 g of trimethylolpropane triacrylate being a second reactive monomer, and 2.00 g of PD7610 being an epoxy-based resin and manufactured by Almatex Corp.), 3.00 g of KBM-403 (manufactured by Shin-Etsu Chemical Co., Ltd.) as an adhesion strength enhancer, 7.00 g of a photoinitiator (5.00 g of Irgacure 907 and 2.00 g of Darocur® ITX), 0.05 g of BYK-307 being a surfactant, and 0.05 g of monomethylether hydroquinone (MEHQ) being a polymerization inhibitor were mixed, and the mixture was stirred for 6 hours to prepare 100 g of a UV-curable ink composition.

The compositions of the UV-curable ink compositions of Preparation Examples 1 to 3 and Comparative Preparation Examples 1 and 2 are shown in the following Table 1.

TABLE 1

| (Unit: g) | | | Preparation Examples | | | | |
|---|---|---|---|---|---|---|---|
| | | | 1 | 2 | 3 | 4 | 5 |
| Pigment dispersion | Pigment | Carbon black | 18.00 | 18.00 | 15.00 | 8.00 | 6.00 |
| | Dispersing agent | Acrylic dispersing agent | 3.60 | 3.60 | 3.00 | 1.60 | 1.20 |
| | First reactive monomer | HDDMA | 38.40 | 38.40 | 32.00 | — | — |
| | | HPNDA | — | — | — | 30.40 | 22.80 |
| | Oligomer | SC9610 | 10.00 | — | 10.00 | 10.00 | 10.00 |
| | | SC6400 | — | 10.00 | — | — | — |
| Binder solution | Second reactive monomer | TMPTA | — | — | 10.00 | 22.00 | 32.00 |
| | | 2-HEA | 17.90 | 17.90 | 17.90 | 15.90 | 15.90 |
| | Epoxy resin | PD7610 | 2.00 | 2.00 | 2.00 | 2.00 | 2.00 |
| | Adhesion strength Enhancer | KBM-403 | 3.00 | 3.00 | 3.00 | 3.00 | 3.00 |
| | Photoinitiator | Irgacure 907 | 5.00 | 5.00 | 5.00 | 5.00 | 5.00 |
| | | ITX | 2.00 | 2.00 | 2.00 | 2.00 | 2.00 |
| | Surfactant | BYK307 | 0.05 | 0.05 | 0.05 | 0.05 | 0.05 |
| | Polymerization inhibitor | MEHQ | 0.05 | 0.05 | 0.05 | 0.05 | 0.05 |

HDDMA: 1,6-hexanediol dimethacrylate
HPNDA: Hydroxypivalic acid neopentyl glycol diacrylate
SC9610: Melamine acrylate oligomer
SC6400: Epoxy acrylate oligomer
TMPTA: Trimethylolpropane triacrylate
2-HEA: 2-hydroxyethyl acrylate
ITX: Isopropyl thioxanthone (Darocur ®ITX)
BYK ® 307: Polyether modified polydimethylsiloxane
MEHQ: Monomethylether hydroquinone

EXAMPLES: MANUFACTURE OF BEZEL

Bezels of Examples 1 to 3 and Comparative Examples 1 to 5 were manufactured by using the UV-curable ink compositions prepared in Preparation Examples 1 to 5.

Example 1. Manufacture of Bezel

The UV-curable ink composition prepared in Preparation Example 1 was printed so as to have a thickness of 5 μm by means of inkjet printing on a tempered glass substrate which had been washed. Subsequently, the bezel pattern was cured by irradiating a rear surface opposite to the ink-patterned substrate with a UV ray, a UV-LED lamp with a wavelength of 395 nm was used as a UV ray irradiation device, and exposure was performed repeatedly with an illuminance of 5,000 mW/cm based on UVV, and a radiation intensity of 5,000 mJ/cm² per transfer until the curing is completed (total radiation intensity of 20,000 mJ/cm²). The measurement of illuminance of the UV lamp was made by measuring the value at a position 10 mm away from the UV-LED lamp by means of a power puck-2 manufactured by EIT, Inc. After each irradiation, latex gloves were worn in order to determine whether the bezel pattern was cured, and then the indentation and tack sense were observed by pressing the bezel pattern. The cured bezel was heat-treated in an oven at 200° C. for 15 minutes.

Example 2. Manufacture of Bezel

A bezel was manufactured in the same manner as in Example 1, except that the UV-curable ink composition prepared in Preparation Example 2 was used.

Example 3. Manufacture of Bezel

A bezel was manufactured in the same manner as in Example 1, except that the UV-curable ink composition prepared in Preparation Example 3 was printed so as to have a thickness of 8 μm by means of inkjet printing on a tempered glass substrate which had been washed.

Example 4. Manufacture of Bezel

The UV-curable ink composition prepared in Preparation Example 1 was printed so as to have a thickness of 5 μm by means of inkjet printing on a tempered glass substrate which had been washed. Subsequently, the bezel pattern was cured by irradiating the rear surface with a UV ray, and the UV irradiation conditions were the same as those in Example 1, but exposure was additionally performed at a radiation intensity of 10,000 mJ/cm². The cured bezel pattern was heat-treated in an oven at 200° C. for 15 minutes.

Comparative Example 1. Manufacture of Bezel

The UV-curable ink composition prepared in Preparation Example 1 was printed so as to have a thickness of 5 μm by means of inkjet printing on an LCD glass substrate which had been washed. The inkjet head used during the inkjet printing was QS-256/10AAA manufactured by Dimatix, Inc. Subsequently, the bezel pattern was cured by irradiating the bezel surface with a UV ray, a UV-LED lamp with a wavelength of 395 nm was used as a UV ray irradiation device, and exposure was performed repeatedly with an illuminance of 5,000 mW/cm based on UVV, and a radiation intensity of 5,000 mJ/cm² per transfer until the curing is completed. The measurement of illuminance of the UV lamp was made by measuring the value at a position 10 mm away from the UV-LED lamp by means of a power puck-2 manufactured by EIT, Inc. After each irradiation, latex gloves were worn in order to determine whether the bezel pattern was cured, and then the indentation and tack sense were observed by pressing the bezel pattern. The cured bezel was heat-treated in an oven at 200° C. for 15 minutes.

Comparative Example 2. Manufacture of Bezel

A bezel was manufactured in the same manner as in Comparative Example 1, except that the UV-curable ink composition prepared in Preparation Example 2 was used.

Comparative Example 3. Manufacture of Bezel

A bezel was manufactured in the same manner as in Comparative Example 1, except that the UV-curable ink composition prepared in Preparation Example 3 was used.

Comparative Example 4. Manufacture of Bezel

A bezel was manufactured in the same manner as in Comparative Example 1, except that the UV-curable ink composition prepared in Preparation Example 4 was used.

Comparative Example 5. Manufacture of Bezel

A bezel was manufactured in the same manner as in Comparative Example 1, except that the UV-curable ink composition prepared in Preparation Example 5 was used.

Comparative Example 6. Manufacture of Bezel

The UV-curable ink composition prepared in Preparation Example 1 was printed so as to have a thickness of 5 μm by means of inkjet printing on a tempered glass substrate which had been washed. Subsequently, the bezel pattern was cured by irradiating the rear surface with a UV ray, and the UV irradiation conditions were the same as those in Example 1, but the cured bezel pattern was not heat-treated in an oven.

EXPERIMENTAL EXAMPLES: PERFORMANCE OF MANUFACTURED BEZEL

Experimental Example 1. Measurement of Optical Density (OD), Surface Hardness, and Adhesion Strength For the bezels manufactured in Examples 1 to 3 and Comparative Examples 1 to 6, an experiment of measuring the optical density (OD), the adhesion strength, and the surface hardness was carried out, and the results are shown in the following Table 2.

The measurement of the optical density was evaluated by means of x-rite 341C.

The surface hardness was measured by using a pencil hardness tester, and measured under the conditions of a thickness angle of 45 degrees and a load of 500 g (standard: ASTM D3363).

For the measurement of adhesion strength, the adhesion strength was evaluated as 0B to 5B by carrying out a cross cut test (standard: ASTM D3359).

Experimental Example 2. Evaluation of Chemical Resistance

For the bezels manufactured in Examples 1 to 3 and Comparative Examples 1 to 6, the chemical resistance was evaluated. The bezels were immersed and left to stand at 70° C. for 15 minutes in an alkali solution (SC-320, manufactured by AMC Inc., and then it was observed whether the bezels were peeled off. The results are shown in the following Table 2.

oligomer), and then rear surface-cured, and the bezel characteristics were exhibited as excellent.

The bezel in Example 3 was printed with the ink composition in Preparation Example 3 (the content of carbon black being a pigment was lower than that of the ink composition in Preparation Example 1), and then rear surface-cured, and the bezel characteristics were exhibited as excellent.

The bezel in Comparative Example 1 was printed with the ink composition in Preparation Example 1, and then surface-cured, a curing shrinkage occurred, and as a result, the light blocking characteristics (optical density 2.5) and the adhesion strength were exhibited as insufficient.

The bezel in Comparative Example 2 was printed with the ink composition in Preparation Example 2, and then surface-cured, a curing shrinkage occurred, and as a result, the light blocking characteristics and the adhesion strength were not good.

The bezel in Comparative Example 3 was printed with the ink composition in Preparation Example 3, and then surface-cured, a curing shrinkage occurred, and as a result, the light blocking characteristics and the adhesion strength were not good.

The bezel in Comparative Example 4 was printed with the ink composition in Preparation Example 4 (a pigment in a content of 8 parts by weight based on 100 parts by weight of the ink composition), and then surface-cured, a curing shrinkage occurred, and as a result, the light blocking characteristics and the adhesion strength were not good.

Although the bezel in Comparative Example 5 was printed with the ink composition in Preparation Example 5 (a pigment in a content of 6 parts by weight based on 100 parts by weight of the ink composition), and then surface-cured, no curing shrinkage occurred, but there is a disadvantage in that the printing thickness was shown as 18 μm, which is too high.

The bezel in Comparative Example 6 was printed with the ink composition in Preparation Example 1, and then rear

TABLE 2

| | Examples | | | Comparative Examples | | | | | |
|---|---|---|---|---|---|---|---|---|---|
| | 1 | 2 | 3 | 1 | 2 | 3 | 4 | 5 | 6 |
| | | | | Ink composition Preparation Examples | | | | | |
| | 1 | 2 | 3 | 1 | 2 | 3 | 4 | 5 | 1 |
| Curing method | Rear surface | Rear surface | Rear surface | Surface | Surface | Surface | Surface | Surface | Rear surface |
| Shrinkage | OK | OK | OK | NG | NG | NG | NG | OK | OK |
| Printing thickness (μm) | 5 | 5 | 8 | 5 | 5 | 8 | 15 | 18 | 5 |
| Optical density (OD) | 5.4 | 5.4 | 5.3 | 2.5 | 2.5 | 2.4 | 2.4 | 5.5 | 5.4 |
| Surface hardness | 4H | 4H | 4H | 3H | 3H | 3H | 3H | 4H | 4H |
| Adhesion strength | 5B | 5B | 5B | 0B | 0B | 0B | 0B | 5B | 0B |
| Chemical resistance | OK | OK | OK | OK | OK | OK | OK | OK | OK |

After the ink composition in Preparation Example 1 was printed on the bezel Example 1, the rear surface was cured, no shrinkage occurred, the optical density (O.D) in a printing thickness of 5 μm was 5 or more, and the light blocking characteristics, surface hardness, adhesion strength, and chemical resistance were excellent.

The bezel in Example 2 was printed with the ink composition in Preparation Example 2 (including an epoxy surface-cured, no shrinkage occurred, but the adhesion strength was not good because no heat treatment was carried out.

The invention claimed is:
1. A method for forming a bezel pattern using inkjet printing, the method comprising:
   a) forming a bezel pattern on a substrate by inkjet printing on the substrate a UV-curable ink composition comprising;

a pigment dispersion;
a melamine acrylate oligomer;
an adhesion strength enhancer;
a binder solution; and
a photoinitiator;
b) rear surface curing the bezel pattern by irradiating the bezel pattern with a UV ray; and
c) heat-treating the rear surface-cured bezel pattern at a temperature between 150° C.-250° C. for 5-30 minutes.

2. The method of claim 1, further comprising a step b') surface curing the bezel pattern before carrying out the step c) after the step b).

3. The method of claim 1, wherein the pigment dispersion comprises a pigment, a dispersing agent, and a first reactive monomer; and is comprised in an amount of 45 to 70 parts by weight based on 100 parts by weight of the UV-curable ink composition.

4. The method of claim 3, wherein the pigment is comprised in an amount of 25 to 35 parts by weight based on 100 parts by weight of the pigment dispersion.

5. The method of claim 3, wherein the first reactive monomer is one selected from the group consisting of 1,6-hexanediol diacrylate (HDDMA), hydroxypivalic acid neopentyl glycol diacrylate (HPNDA), trimethylolpropane triacrylate (TMPTA), pentaerythritol triacrylate, trimethylene propane triacrylate, pentaerythritol triacrylate, trimethylene propyl triacrylate, propoxylated glycerol triacrylate, and a mixture of two or more thereof.

6. The method of claim 1, wherein the adhesion strength enhancer is 3-glycidoxypropyl trimethoxysilane.

7. The method of claim 1, wherein the binder solution is composed of an epoxy-based resin and a second reactive monomer; and is comprised in an amount of 10 to 30 parts by weight based on 100 parts by weight of the UV-curable ink composition.

8. The method of claim 7, wherein the second reactive monomer is an acrylate-based monomer, and is one selected from the group consisting of 2-hydroxyethyl acrylate (2-HEA), trimethylolpropane triacrylate (TMPTA), hydroxyethyl methacrylate (HEMA), hexanediol diacrylate (HDDA), hydroxypivalic acid neopentyl glycol diacrylate (HPNDA), tripropyleneglycol diacrylate (TPGDA), and a mixture of two or more thereof.

9. The method of claim 1, wherein the oligomer is comprised in an amount of 5 to 15 parts by weight based on 100 parts by weight of the UV-curable ink composition.

10. The method of claim 1, wherein the photoinitiator is one selected from the group consisting of 2-methyl-1-[4-(methylthio)phenyl]-2-(4-morpholinyl)-1-propanone (Irgacure® 907), isopropyl thioxanthone (Darocur® ITX), and a mixture thereof.

11. The method of claim 1, wherein the UV-curable ink composition further comprises one or more selected from the group consisting of a surfactant and a polymerization inhibitor.

12. The method of claim 1, wherein the UV-curable ink composition is cured by absorbing a UV ray with a wavelength range of 360 nm to 410 nm at a curing dose of 1,000 to 20,000 mJ/cm$^2$.

13. The method of claim 1, wherein the UV-curable ink composition has a viscosity of 1 cP to 50 cP at 25° C.

14. The method of claim 1, wherein the polymerization inhibitor is monomethylether hydroquinone (MEHQ).

* * * * *